United States Patent
Hughes et al.

(10) Patent No.: US 10,353,855 B2
(45) Date of Patent: Jul. 16, 2019

(54) SYSTEMS, DEVICES AND METHODS FOR A CALCULATOR USER INTERFACE

(71) Applicant: Digitalchemy, LLC, Redmond, WA (US)

(72) Inventors: Aidan Thomas Hughes, Redmond, WA (US); Micah Andrew Koffron, Redmond, WA (US); Eric Charles Moselle, Redmond, WA (US); Yi Chen, Redmond, WA (US)

(73) Assignee: DIGITALCHEMY, LLC, Redmond, WA (US)

( * ) Notice: Subject to any disclaimer, the term of this patent is extended or adjusted under 35 U.S.C. 154(b) by 162 days.

(21) Appl. No.: 14/531,934

(22) Filed: Nov. 3, 2014

(65) Prior Publication Data

US 2015/0128084 A1 May 7, 2015

Related U.S. Application Data

(60) Provisional application No. 61/900,362, filed on Nov. 5, 2013.

(51) Int. Cl.
*G06F 15/02* (2006.01)
*G06F 3/0488* (2013.01)

(52) U.S. Cl.
CPC .......... *G06F 15/02* (2013.01); *G06F 3/04886* (2013.01); *G06F 2203/04804* (2013.01)

(58) Field of Classification Search
CPC ....... G06F 2203/04804; G06F 3/04886; G06F 15/02
See application file for complete search history.

(56) References Cited

U.S. PATENT DOCUMENTS

| | | | |
|---|---|---|---|
| 6,920,606 B1* | 7/2005 | Jablonski | G06Q 30/02 345/619 |
| 2006/0064471 A1* | 3/2006 | Hewett | G06F 17/248 709/219 |
| 2009/0319928 A1* | 12/2009 | Alphin, III | G06F 9/4443 715/765 |

(Continued)

OTHER PUBLICATIONS

Smalldarcher, play.google.com, Jul. 13, 2013, Widget Calculator No Ads, https://web.archive.org/web/20130822060822/https://play.google.com/store/apps/details?id=smalldarcher.free.calculator.widget, pp. 1-3.*

(Continued)

*Primary Examiner* — William L Bashore
*Assistant Examiner* — Daniel W Parcher
(74) *Attorney, Agent, or Firm* — Seed IP Law Group LLP

(57) ABSTRACT

A software calculator is provided herein that includes an art object displayed along with the calculator as part of the calculator. The art object may be displayed as a background image, a portion of which is shown behind the controls and input/output display area of the calculator. The user may select other images from a gallery of available images to be displayed along with the calculator. The user may also provide rating for and/or purchase a print or an original of the art object currently being displayed by a click of a button or link displayed on the user interface of the calculator. The displayed art object may also automatically change or otherwise be updated according to user preferences.

9 Claims, 10 Drawing Sheets

(56) References Cited

U.S. PATENT DOCUMENTS

| | | | | |
|---|---|---|---|---|
| 2010/0011300 A1* | 1/2010 | AlHusseini | H04L 67/38 | 715/747 |
| 2010/0093324 A1* | 4/2010 | Gupta | H04L 67/306 | 455/414.2 |
| 2010/0192219 A1* | 7/2010 | Carvajal | H04N 21/44222 | 726/19 |
| 2014/0040819 A1* | 2/2014 | Duffy | G06F 9/4443 | 715/789 |

OTHER PUBLICATIONS

Anthony, uxmovement.com, Oct. 21, 2010, Applying the Golden Ratio to Layouts and Rectangles, http://uxmovement.com/content/applying-the-golden-ratio-to-layouts-and-rectangles/, p. 1.*
JakeyBoy, modmyi.com, Calculator-Backgrounds, Jul. 18, 2007, http://modmyi.com/forums/skinning-themes-discussion/799-calculator-backgrounds.html, pp. 1-3.*

* cited by examiner

SYSTEMS, DEVICES AND METHODS FOR A CALCULATOR USER INTERFACE

BRIEF SUMMARY

A computer-implemented method may be summarized as including: configuring, by at least one computer processor, a graphical user interface to present an operable calculator including user-selectable interface elements representing calculator control buttons and at least one display area to display calculator input and output; configuring, by at least one computer processor, the user interface to present an art object along with the calculator on the graphical user interface; and configuring, by at least one computer processor, the graphical user interface to present a user-selectable interface element along with the calculator that, when selected, provides access to a selection of selectable art objects associated with an art object that is currently presented along with the calculator on the graphical user interface.

The method may further include: configuring, by at least one computer processor, the graphical user interface to change the art object currently presented along with the calculator on the graphical user interface when an indication of a selection of a different art object is received from a user of the calculator. A portion of the art object currently presented along with the calculator may be presented as a background to the calculator on the graphical user interface. The portion of the art object currently presented as a background to the calculator on the graphical user interface may be smaller than a remaining portion of the art object that is currently presented along with the calculator on the graphical user interface. The configuring, by the at least one computer processor, the user interface to present an art object along with the calculator on the graphical user interface may include configuring the user interface to display the art object and overlay the operable calculator on top of a portion of the art object. The portion of the art object on which the operable calculator is overlaid may be smaller than a remaining displayed portion of the art object. The remaining displayed portion of the art object may be about $$\frac{1+\sqrt{5}}{2}$$

times larger than the portion of the art object on which the operable calculator is overlaid. The selection of selectable art objects associated with an art object that is currently presented along with the calculator on the graphical user interface may consist of art objects by a same artist as who created the art object that is currently presented. The method may further include: configuring, by at least one computer processor, the graphical user interface to present, in response to receiving an indication of selection of the user-selectable interface element presented along with the calculator, the selection of selectable art objects associated with the art object. The method may further include: configuring, by at least one computer processor, the graphical user interface to change the art object presented along with the calculator on the graphical user interface to a different art object from the selection of selectable art objects when an indication of a selection of the different art object from the selection of selectable art objects is received from a user of the calculator. The method may further include: configuring, by at least one computer processor, the graphical user interface to communicate a rating of the art object that is presented along with the calculator on the graphical user interface when an indication of the rating is received from a user of the calculator. The method may further include: configuring, by at least one computer processor, the graphical user interface to initiate a purchase a desired art object from the selection of selectable art objects when an indication of a selection of the desired art object from the selection of selectable art objects is received from a user of the calculator.

A non-transitory computer readable storage medium may be summarized as including computer-executable instructions stored thereon that when executed by a computer processor cause the computer processor to perform: presenting on a graphical user interface an operable calculator including user-selectable interface elements representing calculator control buttons and at least one display area to display calculator input and output; presenting on the graphical user interface an art object along with the calculator on the graphical user interface; and presenting on the graphical user interface a user-selectable interface element along with the calculator that, when selected, provides access to a selection of selectable art objects available to be presented instead of the art object that is currently presented along with the calculator on the graphical user interface.

The art object may be an image of a painting or a drawing. The computer-executable instructions stored thereon, when executed by a computer processor, may further cause the computer processor to perform: changing the art object currently presented along with the calculator on the graphical user interface when an indication of a selection of a different art object is received from a user of the calculator. The computer-executable instructions stored thereon, when executed by a computer processor, may further cause the computer processor to perform: presenting on the graphical user interface, in response to receiving an indication of selection of the user-selectable interface element presented along with the calculator, the selection of selectable art objects associated with the art object. The user-selectable interface element presented along with the calculator may be a link to an on-line art gallery.

A calculator may be summarized as including: an art object displayed on a graphical user interface; operable user-selectable interface elements representing calculator control buttons and at least one display area to display calculator input and output displayed along with the art object on the graphical user interface; and a user-selectable interface element, displayed on the graphical user interface along with the operable user-selectable interface elements representing calculator control buttons, that when selected, provides access to a selection of selectable art objects associated with the art object displayed on the graphical user interface.

The operable user-selectable interface elements representing calculator control buttons and at least one display area to display calculator input and output may be overlaid on top of a portion of the art object displayed on the graphical user interface. The art object displayed on the graphical user interface may automatically change periodically. The art object displayed on the graphical user interface may automatically change periodically based on user preferences regarding a particular artist.

A system for displaying art objects may be summarized as including: a processor; a processor-readable memory that stores instructions executable by the processor to cause the processor to: provide an software application that includes an operable calculator that displays an art object along with user-selectable interface elements representing calculator control buttons and at least one display area to display calculator input and output; and provide to a user of the software application, via a user selectable interface element of the software application, a selection of selectable art objects associated with an art object that is currently presented along with the calculator.

The instructions executable by the processor may further cause the processor to: update the selection of selectable art objects associated with an art object that is currently presented along with the user-selectable interface elements representing calculator control buttons. The instructions executable by the processor may further cause the processor to: initiate a purchase of the art object that is currently presented along with the user-selectable interface elements representing calculator control buttons in response to a selection by the user of the calculator. The instructions executable by the processor may further cause the processor to: initiate a purchase of one or more art objects from the selection of selectable art objects associated with the art object that is currently presented along with the user-selectable interface elements representing calculator control buttons in response to a selection by the user of the calculator.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems including client and server computing systems, as well as networks, including various types of telecommunications networks, have not been shown or described in detail to avoid unnecessarily obscuring descriptions of the embodiments.

Unless the context requires otherwise, throughout the specification and claims which follow, the word "comprise" and variations thereof, such as "comprises" and "comprising," are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Figure 1:
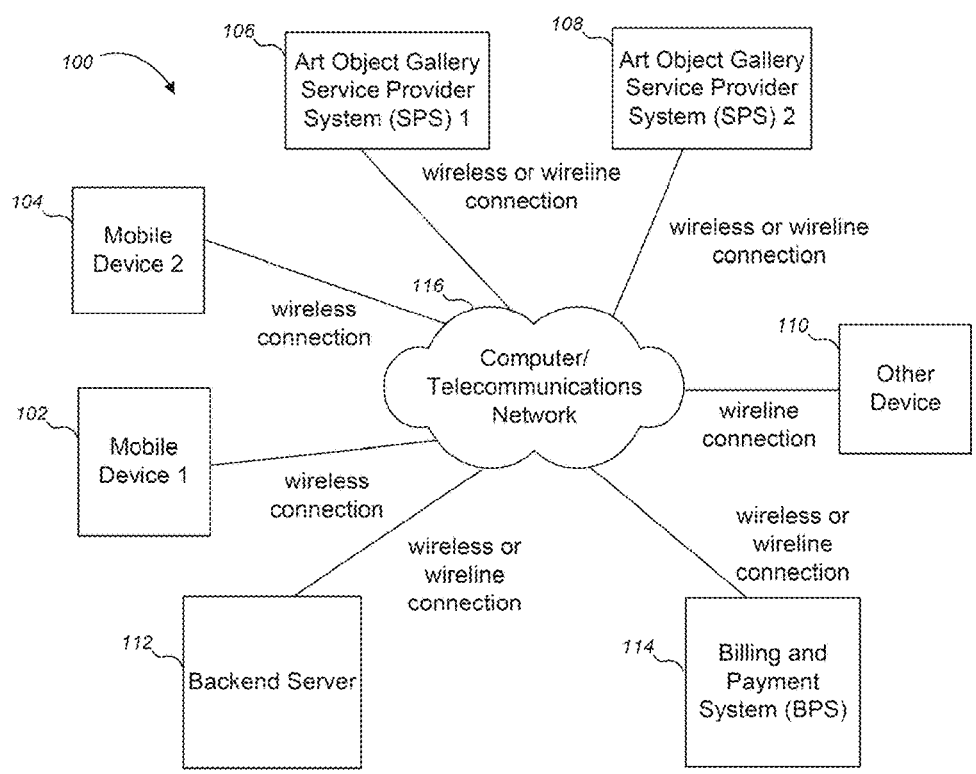
FIG. 1 is a system diagram of a networked environment, in which systems, devices and methods for a calculator user interface may be a part, or in which they may be implemented, according to one example illustrated embodiment.

FIG. 1 is a system diagram of a networked environment, in which systems, devices and methods for a calculator user interface may be a part, or in which they may be implemented, according to one example illustrated embodiment.

The networked environment 100 may include a plurality of mobile devices (e.g., mobile device 1 102 and mobile device 2 104), a plurality of art object gallery service provider systems (e.g., art object gallery service provider system (SPS) 1 106 and art object gallery service provider system (SPS) 2 108), one or more other devices (e.g., other device 110), a backend server system (backend server) 112 and a billing and payment system (BPS) 114. The mobile device 1 102 and mobile device 2 104, art object gallery service provider system (SPS) 1 106 and art object gallery service provider system (SPS) 2 108, other device 110, backend server 112 and the billing and payment system (BPS) 114 are all communicatively coupled via a computer/telecommunications network 116. Additional mobile devices, other devices and service providers may also be present and included in the network environment, but are not illustrated for clarity of presentation.

The computer/telecommunications network 116 may be any telecommunications network, computer network or combination of telecommunications and computer networks that enables communication between the various devices connected to the network 116 shown in FIG. 1. For example, mobile telecommunications provided by network 116 may include various digital mobile telecommunications including those according to the International Mobile Telecommunications Advanced (IMT-Advanced) specification specified by the International Telecommunications Union-Radio communications sector (ITU-R), such as those of Mobile WiMAX and Long Term Evolution (LTE) standard, better known as the 4th Generation (4G), family of standards for mobile telecommunications fulfilling specifications by the International Telecommunication Union.

The mobile devices 104 and 106 (e.g., mobile phones, tablet devices, electronic book readers, notebook computers, wearable devices, watches, computerized jewelry, computerized clothing, etc.) the other device 110, SPS 106, SPS 108, backend server 112 and BPS 114 may be additionally or optionally linked by one or more other communication links or networks that comprise network 116. For example, a communications network of network 116 may include a local area network that uses wireless fidelity (Wi-Fi) high frequency radio signals to transmit and receive data over distances of a few hundred feet. The local area network may be a wireless local area network (WLAN) based on the Institute of Electric and Electronic Engineers (IEEE) 802.11 standards. However, other wired and wireless communications networks and protocols may be used to link the various devices and systems shown in FIG. 1. Thus, the mobile devices 102 and 104 may have various applicable wireless transmitters and receivers and, in the case of using a Wi-Fi wireless link, may also have the corresponding executable Wi-Fi compatible network communications software that initiates, controls, maintains or manages the wireless link between the mobile devices 102 and 104 and the various other devices and systems within or connected to network 116 over the Wi-Fi signal of the network 116.

The network 116 may comprise connections to computing systems such as SPS 1 and SPS 2, backend server 112 and BPS system 114 which provide services to the mobile devices 102 and 104 and other device 110 (i.e., a server-based network), and may itself represent multiple interconnected networks. For instance wired and wireless enterprise-wide computer networks, intranets, extranets, and/or the Internet may be included in or comprise a part of network 116. Also, in some embodiments, one or more of the services provided by SPS 1 and SPS 2, backend server 112 and BPS 114 may be provided by a single system or server. Embodiments may include various types of communication networks including other telecommunications networks, cellular networks, paging networks, and other mobile networks. There may be any variety of computers, switching devices, routers, bridges, firewalls, edge devices, multiplexers, phone lines, cables, telecommunications equipment and other devices within network 116 and/or in the communications paths between the mobile devices 104 and 106, the other device 110, SPS 106, SPS 108, backend server 112 and BPS 114. Some or all of such equipment of network 116 may be owned, leased or controlled by service providers such as SPS 106 and SPS 108.

In accordance with an aspect of the disclosure, the mobile devices 102 and 104 and other device 110 may contain discrete functional program modules that might make use of an application programming interface (API), or other object, software, firmware and/or hardware, to request services of one or more of the other entities within or connected to the network 116, such as SPS 106, SPS 108, BPS 114 and backend server 112. For example, communication can be provided over a communications medium, e.g., client and server systems running on any one of the mobile device 1 102, mobile device 2 104, SPS 106, SPS 108, other device 110, backend server 112 and BPS 114. These client and server systems may be coupled to one another via transmission control protocol/internet protocol (TCP/IP) connection(s) for high-capacity communication. The "client" is a member of a class or group that uses the services of another class or group to which it is not related. In computing, a client is a process, i.e., roughly a set of instructions or tasks, executed by hardware that requests a service provided by another program. Generally, the client process utilizes the requested service without having to "know" any working details about the other program or the service itself. In a client/server architecture, particularly a networked system, a client is usually a computer or device that accesses shared network resources provided by another computer or device, e.g., a server. In the example of FIG. 1, the mobile devices 102 and 104 and other device 110 (e.g., other mobile or stationary device including, but not limited to a notebook computer, desktop computer, entertainment device, media device, television, game console, music player, etc.) may be clients requesting the services of the backend server 112. However, any entity in FIG. 1, including mobile devices 102 and 104, can be considered a client, a server, or both, depending on the circumstances.

One or more cellular towers and stations may be part of a cellular network that is part of the computer/telecommunications network 116 and may be communicatively linked by one or more communications networks or communication mediums within the computer/telecommunications network 116 (e.g., using a cellular or other wired or wireless signal 116) in order to facilitate sending and receiving information in the form of synchronous or asynchronous voice communications and video, image and/or textual data to and from the mobile devices 102 and 104. This communication may be over a wireless signal on the cellular network of network 116 using applicable combinations and layers of telecommunications and networking protocols and standards such as 4G, HTTP and TCP/IP, etc.

Although the physical environment of the network 116 may have connected devices such as computers, the physical environment may alternatively have or be described as comprising various digital devices such as personal digital assistants (PDAs), televisions, media players, MP3 players, etc., software objects such as interfaces, Component Object Model (COM) objects and the like.

There are a variety of systems, components, and network configurations that may also support distributed computing environments within the network 116. For example, computing systems may be connected together within the network 116 by wired or wireless systems, by local networks or by widely distributed networks. Currently, many networks are coupled to the Internet, which provides an infrastructure for widely distributed computing and encompasses many different networks. Any such infrastructures, whether coupled to the Internet or not, may be used in conjunction with, be connected to, or comprise part of the network 116.

The mobile devices 104 and 106 can take the form of any of a large variety of mobile communications and/or processing devices having a handheld form factor. Examples of such may include cellular phones, personal digital assistants or PDAs (e.g., iPhone® devices, Android® devices, Blackberry® devices, etc.), notebook computers, netbook computers, tablet devices or electronic book reading devices (e.g., IPAD® device, Kindle® devices, etc.).

The art object gallery service provider systems 106 108 may be any service provider system that provides art objects in digital form for viewing and/or downloading by a user. For example, this may include images of artwork that a user may browse and/or select for various purposes. The art object gallery service provider systems 106 108 may be those of different art gallery entities, artists, artist groups, retailers or other service providers. In another example embodiment, the images of artwork are provided by the art object gallery service provider systems 106 108 to the entity providing the calculator for download, display and/or operation on the mobile devices 102 104 and may be stored at the back end server 112 or other accessible locations. In some embodiments, one or more of the art object gallery service provider systems 106 108 may be those of the entity providing the calculator for download, display and/or operation on the mobile devices 102 104. The functions performed by the backend server 112, BPS 114 art object gallery service provider systems 106 and 108 may be performed by one or more systems connected to network 116 that combine the functionalities of those systems described above.

Although not required, the embodiments will be described in the general context of computer-executable instructions, such as program application modules, objects, or macros stored on computer- or processor-readable storage media and executed by a computer or processor. Those skilled in the relevant art will appreciate that the illustrated embodiments as well as other embodiments can be practiced with other system configurations and/or other computing system configurations, including hand-held devices, multiprocessor systems, microprocessor-based or programmable consumer electronics, personal computers ("PCs"), network PCs, mini computers, mainframe computers, and the like. The embodiments can be practiced in distributed computing environments where tasks or modules are performed by remote processing devices, which are linked through a communications network such as network 116. In a distributed computing environment, program modules may be located in both local and remote memory storage devices.

Figure 2:
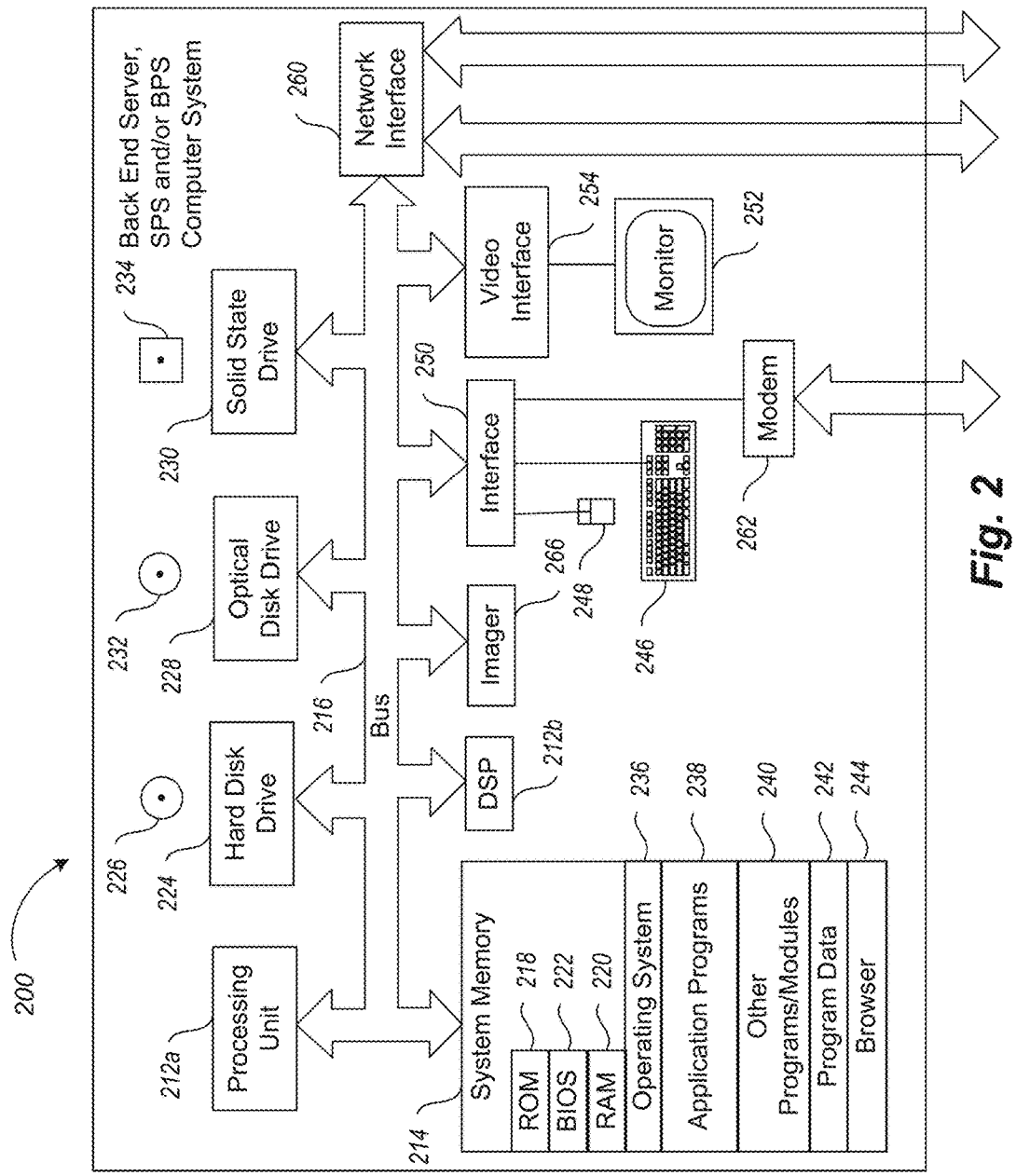
FIG. 2 is a schematic diagram of an example computer system of the backend server, art object gallery or billing and payment system of FIG. 1, suitable for implementing systems, devices and methods for a calculator user interface, according to one example illustrated embodiment.

FIG. 2 is a schematic diagram of an example computer system of the backend server 112, SPS 106 or 108 and/or BPS 114 of FIG. 1.

The computer system 200 is suitable for implementing systems, devices and methods for providing a calculator user interface, according to one illustrated embodiment. The computer system 200 will at times be referred to in the singular herein, but this is not intended to limit the embodiments to a single device since in typical embodiments, there may be more than one computer system or devices involved. Unless described otherwise, the construction and operation of the various blocks shown in FIG. 2 are of conventional design. As a result, such blocks need not be described in further detail herein, as they will be understood by those skilled in the relevant art.

The computer system 200 may include one or more processing units 212a, 212b (collectively 212), an imager 266, a system memory 214 and a system bus 216 that couples various system components including the system memory 214 to the processing units 212. The processing units 212 may be any logic processing unit, such as one or more central processing units (CPUs) 212a, digital signal processors (DSPs) 212b, application-specific integrated circuits (ASICs), field programmable gate arrays (FPGAs), etc. The system bus 216 can employ any known bus structures or architectures, including a memory bus with memory controller, a peripheral bus, and a local bus. The system memory 214 includes read-only memory ("ROM") 218 and random access memory ("RAM") 220. A basic input/output system ("BIOS") 222, which can form part of the ROM 218, contains basic routines that help transfer information between elements within the computer system 200, such as during start-up.

The computer system 200 may also include a plurality of interfaces such as network interface 260, interface 250 supporting modem 262 or any other wireless/wired interfaces.

The computer system 200 may include a hard disk drive 224 for reading from and writing to a hard disk 226, an optical disk drive 228 for reading from and writing to removable optical disks 232, and/or a solid state drive 230 for reading from and writing to solid state memory 234. The optical disk 232 can be a DVD-ROM, while the solid state 234 can be a flash drive or other removable solid state memory device. The hard disk drive 224, optical disk drive 228 and solid state memory drive 230 may communicate with the processing unit 212 via the system bus 216. The hard disk drive 224, optical disk drive 228 and solid state memory drive 230 may include interfaces or controllers (not shown) coupled between such drives and the system bus 216, as is known by those skilled in the relevant art. The drives 224, 228 and 230, and their associated computer-readable storage media 226, 232, 234, may provide nonvolatile and non-transitory storage of computer readable instructions, data structures, program modules and other data for the computer system 200. Although the depicted computer system 200 is illustrated employing a hard disk 224, optical disk 228 and solid state memory device 230, those skilled in the relevant art will appreciate that other types of computer-readable storage media that can store data accessible by a computer may be employed, Bernoulli cartridges, RAMs, ROMs, smart cards, etc. For example, computer-readable storage media may include, but is not limited to, random access memory (RAM), read-only memory (ROM), electrically erasable programmable read-only memory (EEPROM), flash memory, compact disc ROM (CD-ROM), digital versatile disks (DVD) or other optical disk storage, magnetic cassettes, magnetic tape, magnetic disk storage or other magnetic storage devices, solid state memory or any other medium which can be used to store the desired information and which may be accessed by processing unit 212a.

Program modules can be stored in the system memory 214, such as an operating system 236, one or more application programs 238, other programs or modules 240 and program data 242. Application programs 238 may include instructions that cause the processor(s) 212 to provide a software calculator application via communications between various devices such as, for example, mobile device 1 102, mobile device 2 104 and other device 110 of FIG. 1. Other program modules 240 may include instructions for handling security such as password or other access protection and communications encryption. The system memory 214 may also include communications programs, for example, a Web client or browser 244 for permitting the computer system 200 to access and exchange data with sources such as Web sites of the Internet, corporate intranets, extranets, or other networks and devices as described herein, as well as other server applications on server computing systems. The browser 244 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document. A number of Web clients or browsers are commercially available such as those from Mozilla®, Google®, and Microsoft® of Redmond, Washington.

While shown in FIG. 2 as being stored in the system memory 214, the operating system 236, application programs 238, other programs/modules 240, program data 242 and browser 244 can be stored on the hard disk 226 of the hard disk drive 224, the optical disk 232 of the optical disk drive 228 and/or the solid state memory 234 of the solid state memory drive 230.

An operator can enter commands and information into the computer system 200 through input devices such as a touch screen or keyboard 246 and/or a pointing device such as a mouse 248, and/or via a graphical user interface. Other input devices can include a microphone, joystick, game pad, tablet, scanner, etc. These and other input devices are connected to one or more of the processing units 212 through an interface 250 such as a serial port interface that couples to the system bus 216, although other interfaces such as a parallel port, a game port or a wireless interface or a universal serial bus ("USB") can be used. A monitor 252 or other display device is coupled to the system bus 216 via a video interface 254, such as a video adapter. The computer system 200 can include other output devices, such as speakers, printers, etc.

The computer system 200 can operate in a networked environment using logical connections to one or more remote computers and/or devices as described above with reference to FIG. 1. For example, the computer system 200 can operate in a networked environment using logical connections to one or more mobile devices, other devices and other service providers or information servers. Communications may be via a wired and/or wireless network architecture, for instance wired and wireless enterprise-wide computer networks, intranets, extranets, telecommunications networks, cellular networks, paging networks, and other mobile networks.

Figure 3:
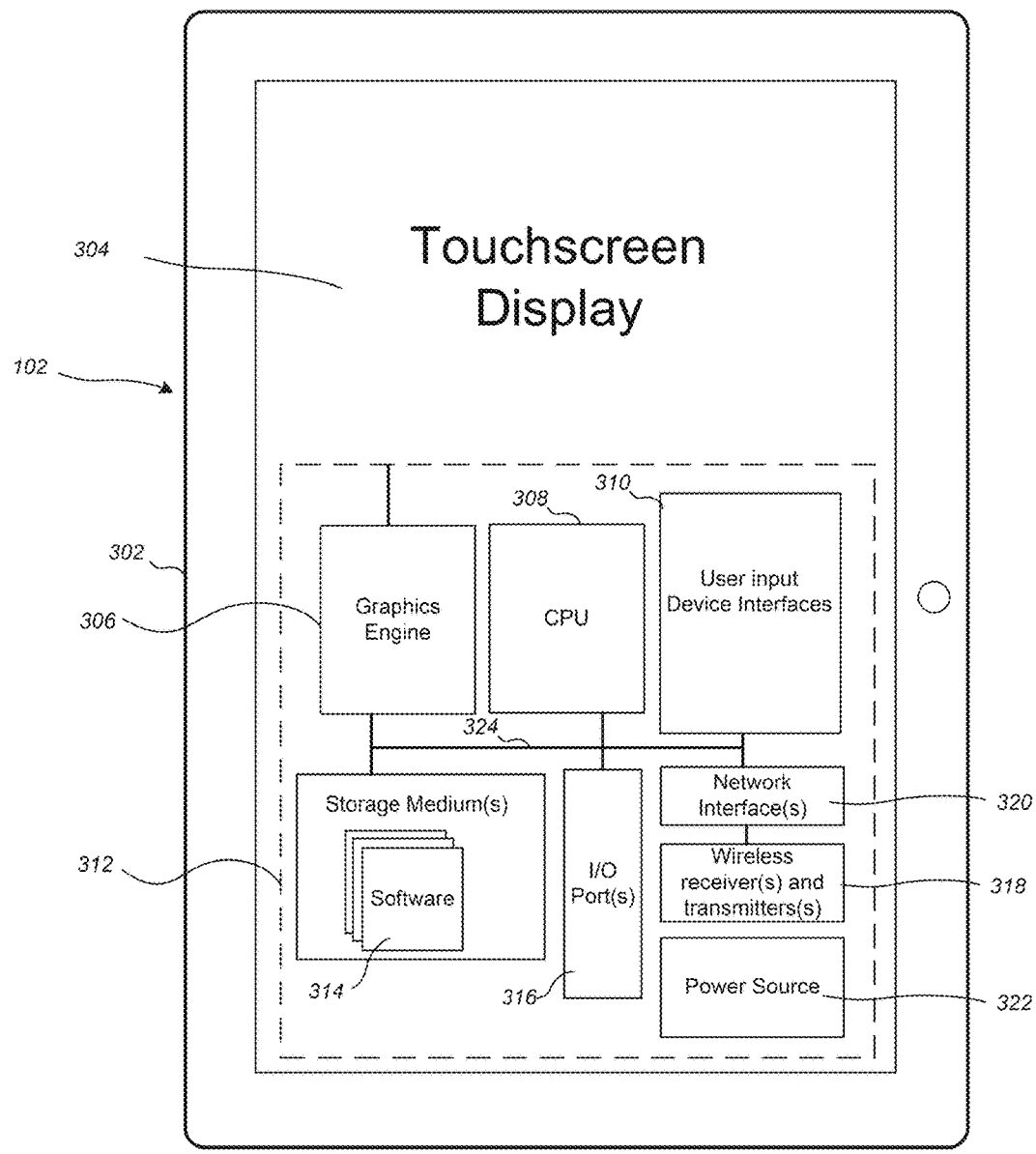
FIG. 3 is a schematic view of one of the mobile devices of FIG. 1, shown in more detail according to one example illustrated embodiment, the mobile device having a housing, a display, a graphics engine, a central processing unit (CPU), user input device(s), one or more storage mediums having various software modules thereon that are executable by the CPU, input/output (I/O) port(s), network interface(s), wireless receiver(s) and transmitter(s), and a power source.

FIG. 3 shows the mobile device 1 102 of FIG. 1 in more detail according to one example embodiment. The mobile device 1 102 may have a housing 302, a display 304, a graphics engine 306, a central processing unit (CPU) 238, one or more user input devices 310, one or more storage mediums 312 having various software modules 314 stored thereon comprising instructions that are executable by the CPU 308, input/output (I/O) port(s) 316, one or more wireless receivers and transmitters 318, one or more network interfaces 320, and a power source 322.

As previously noted, the mobile device 1 102 may be any of a large variety of communications devices such as a tablet device, cellular telephone, a portable media player (PMP), a personal digital assistant (PDA), a mobile communications device, a portable computer with built-in or add-on cellular communications, a portable game console, a global positioning system (GPS), a handheld industrial electronic device, or the like, or any combination thereof. The mobile device 1 102 has at least one central processing unit (CPU) 308 which may be a scalar processor, a digital signal processor (DSP), a reduced instruction set (RISC) processor, or any other suitable processor. The central processing unit (CPU) 308, display 304, graphics engine 306, one or more user input devices 310, one or more storage mediums 312, input/output (I/O) port(s) 316, one or more wireless receivers and transmitters 318, and one or more network interfaces 320 may all be communicatively connected to each other via a system bus 324. The system bus 324 can employ any suitable bus structures or architectures, including a memory bus with memory controller, a peripheral bus, and/or a local bus.

The mobile device 1 102 also includes one or more volatile and/or non-volatile storage medium(s) 312. The storage mediums 312 may be comprised of any single or suitable combination of various types of processor-readable storage media and may store instructions and data acted on by CPU 308. For example, a particular collection of software instructions comprising software 314 and/or firmware instructions comprising firmware are executed by CPU 308. The software or firmware instructions generally control many of the operations of the mobile device 1 102 and a subset of the software and/or firmware instructions may perform functions to operatively configure hardware and other software in the mobile device 1 102 to provide the initiation, control and maintenance of applicable computer network and telecommunication links from the mobile device 1 102 to another subscriber device such as mobile device 2 104 or other device 110 via the network 116 as shown in FIG. 1 using the wireless receiver(s) and transmitter(s) 318, network interface(s) 320, and/or I/O ports 316. Such software or firmware instructions may also implement the calculator, calculator user interface and associated functions thereof described herein.

By way of example, and not limitation, the storage medium(s) 312 may be processor-readable storage media which may comprise any combination of computer storage media including volatile and nonvolatile, removable and non-removable media implemented in any method or technology for storage of information such as computer readable instructions, data structures, program modules or other data. Combinations of any of the above should also be included within the scope of processor-readable storage media.

The storage medium(s) 312 may include system memory which includes computer storage media in the form of volatile and/or nonvolatile memory such as read-only memory (ROM) and random access memory (RAM). A basic input/output system (BIOS), containing the basic routines that help to transfer information between elements within mobile device 1 102, such as during start-up or power-on, is typically stored in ROM. RAM typically contains data and/or program modules that are immediately accessible to and/or presently being operated on by CPU 308. By way of example, and not limitation, FIG. 3 illustrates software modules 314 including an operating system, application programs and other program modules that implement the processes and methods described herein.

The mobile device 1 102 may also include other removable/non-removable, volatile/nonvolatile computer storage media drives. By way of example only, the storage medium(s) 312 may include a hard disk drive or solid state storage drive that reads from or writes to non-removable, nonvolatile media, a solid state memory drive that reads from or writes to a removable, nonvolatile magnetic disk, and an optical disk drive that reads from or writes to a removable, nonvolatile optical disk such as a DVD ROM or other optical media. Other removable/non-removable, volatile/nonvolatile computer storage media that can be used in an operating environment of the mobile device 1 102 include, but are not limited to, flash memory cards, digital versatile disks, micro-discs, digital video tape, solid state RAM, solid state ROM, and the like. The storage medium(s) are typically connected to the system bus 324 through a non-removable memory interface. The storage medium(s) 312 discussed above and illustrated in FIG. 3, provide storage of computer readable instructions, data structures, program modules and other data for the mobile device 1 102. In FIG. 3, for example, a storage medium may store software 314 including an operating system, application programs, other program modules, and program data. The storage medium(s) 312 may implement a file system, a flat memory architecture, a database, or any other method or combination capable for storing such information.

A user may enter commands and information into the mobile device 1 102 through touch screen display 304 or the one or more other input device(s) 310 such as a keypad, keyboard, camera, motion sensor, position sensor, light sensor, biometric data sensor, accelerometer, or a pointing device, commonly referred to as a mouse, trackball or touch pad. Other input devices of the mobile device 1 102 may include a microphone, joystick, thumbstick, game pad, optical scanner, other sensors, or the like. These and other input devices are often connected to the CPU 308 through a user input interface that is coupled to the system bus 324, but may be connected by other interface and bus structures, such as a parallel port, serial port, wireless port, game port or a universal serial bus (USB). Generally, a unique software driver stored in software 314 configures each input mechanism to sense user input, and then the software driver provides data points that are acted on by CPU 308 under the direction of other software 314. The display is also connected to the system bus 324 via an interface, such as the graphics engine 306. In addition to the display 304, the mobile device 1 102 may also include other peripheral output devices such as speakers, a printer, a projector, an external monitor, etc., which may be connected through one or more analog or digital I/O ports 316, network interface(s) 320 or wireless receiver(s) and transmitter(s) 318.

The mobile device 1 102 may operate in a networked environment using connections to one or more remote computers or devices, such as a remote computer or device of the backend server 112, SPS 106, SPS 108, and/or BS 114 within or connected to the computer network 116 of FIG. 1 and described above. The remote computer within or connected to network 116 may be a personal computer, a server, a router, a network PC, a peer device or other common network node, and typically includes many or all of the elements described above relative to the computer system 200 of FIG. 2. Such connections to the network 116 may include connections over cellular, satellite, local area network (LAN) connections or wide area network (WAN) connections as described above, and/or other networks.

When used in a LAN or WAN networking environment, the mobile device 1 102 may be connected via the wireless receiver(s) and transmitter(s) 318 and network interface(s) 320, which may include, for example, cellular receiver(s) and transmitter(s), Wi-Fi receiver(s) and transmitter(s), and associated network interface(s). When used in a WAN networking environment, the mobile device 1 102 may include a modem or other means as part of the network interface(s) for establishing communications over the WAN, such as the Internet. The wireless receiver(s) and transmitter(s) 318 and the network interface(s) 320 may be communicatively connected to the system bus 324. In a networked environment, program modules depicted relative to the mobile device 1 102, or portions thereof, may be stored in a remote memory storage device of a remote system.

The mobile device 1 102 has a collection of I/O ports 316 and/or short range wireless receiver(s) and transmitter(s) 318 and network interface(s) 320 for passing data over short distances to and from the mobile device 1 102 or for coupling additional storage to the mobile device 1 102. For example, serial ports, USB ports, Wi-Fi ports, Bluetooth® ports, IEEE 1394 (i.e., FireWire), and the like can communicatively couple the mobile device 1 102 to other computing apparatuses. Compact Flash (CF) ports, Secure Digital (SD) ports, and the like can couple a memory device to the mobile device 1 102 for reading and writing by the CPU 308 or couple the mobile device 1 102 to other communications interfaces such as Wi-Fi or Bluetooth transmitters/receivers and/or network interfaces.

Mobile device 1 102 also has a power source 322 (e.g., a battery). The power source 322 may supply energy for all the components of the mobile device 1 102 that require power when a traditional, wired power source is unavailable or otherwise not connected. Other various suitable system architectures and designs of the mobile device 1 102 are contemplated and may be utilized which provide the same, similar or equivalent functionality as those described herein.

It should be understood that the various techniques described herein may be implemented in connection with hardware, software and/or firmware or, where appropriate, with a combination of such. Thus, the methods and apparatus of the disclosure, or certain aspects or portions thereof, may take the form of program code (i.e., instructions) embodied in tangible media, such as floppy diskettes, CD-ROMs, hard drives, flash drives, or any other machine-readable or processor-readable storage medium wherein, when the program code is loaded into and executed by a machine, such as a processor of a computer or mobile device, the machine becomes an apparatus for practicing various embodiments. In the case of program code execution on programmable computers or mobile devices, such generally includes a processor, a storage medium readable by the processor (including volatile and non-volatile memory and/or storage elements), at least one input device, and at least one output device. One or more programs may implement or utilize the processes described in connection with the disclosure, e.g., through the use of an API, reusable controls, or the like. Such programs are preferably implemented in a high level procedural or object oriented programming language to communicate with a computer system including the computer system 200 depicted in FIG. 2 and also in FIG. 3 of mobile device 1 102. However, the program(s) can be implemented in assembly or machine language, if desired. In any case, the language may be a compiled or interpreted language, and combined with hardware implementations.

Figure 4:
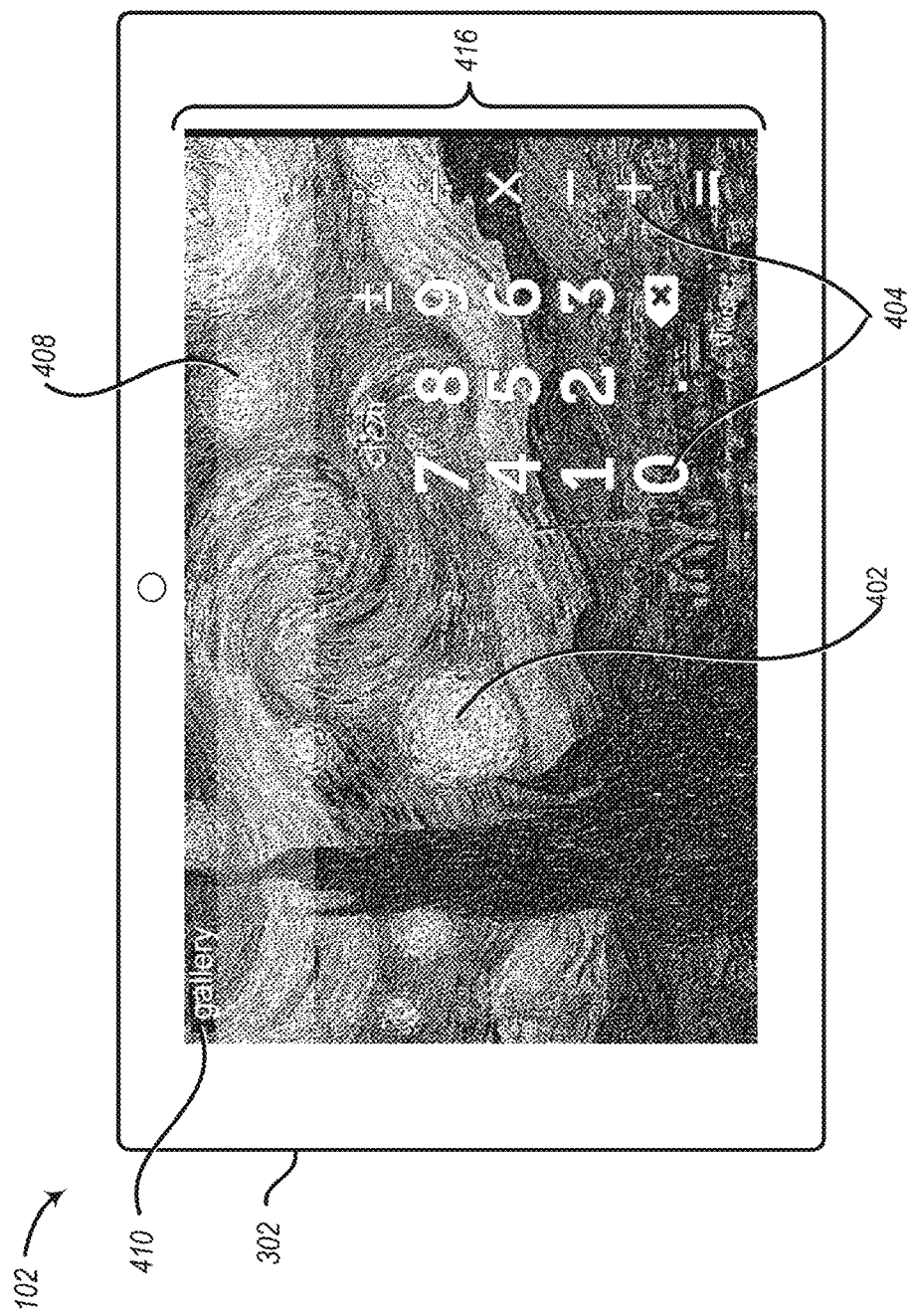
FIG. 4 is a schematic view of mobile device displaying a calculator user interface showing an art object being displayed along with user-selectable interface elements representing the calculator control buttons and input/output display area, according to one example illustrated embodiment.

FIG. 4 is a schematic view of mobile device 102 displaying a calculator user interface showing an art object being displayed along with user-selectable interface elements representing the calculator control buttons and input/output display area, according to one example illustrated embodiment.

In FIG. 4, an operable calculator 416 is displayed on the mobile device 102. In this example, the mobile device 102 has a touchscreen on which the software calculator 416 is displayed. In the present example, the calculator 416 presents an image of the painting "Starry Night" 402 by Vincent van Gogh as part of the calculator and on which is overlaid user-selectable interface elements 404 of the calculator 416 (e.g., number buttons, operator buttons, clear buttons, backspace buttons, etc.). These user-selectable interface elements 404 of the calculator 416 are configured to be activated when a user touches the respective button or other respective user-selectable interface element on the touchscreen of the mobile device 102. Also overlaid on the image 402 is an input/output display area 408 to display input and output of the calculator 416. In some embodiments, this input/output display area 408 may show a history of previous calculation operations and outputs and may automatically expand or contract depending on the amount of history to be displayed. Any of the user interface elements of the calculator 416 may be selectable using one or more tapping, swiping, or other gestures by the user.

Also, in various embodiments, the user-selectable interface elements 404, input/output display area 408 and numbers and symbols displayed in the input/output display area 408 may have varying degrees of transparency selectable by the user of the calculator 416. This may be such that the image 402 behind the user-selectable interface elements 404 and input/output display area 408 of the calculator 416 may be able to be seen in varying degrees depending on the level of transparency selected. In various other embodiments, other operable user interface elements of a calculator may be selectively or permanently displayed on the mobile device including, but not limited to those regarding scientific operations, additional operators, different sets of number buttons to facilitate the entering and calculation of fractions, graphing functions, equation symbols, memory buttons, etc. The color, style, fill, format, size, texture, line weight, font and/or transparency of the user-selectable interface elements 404, input/output display area 408 and/or numbers and symbols displayed in the input/output display area 408 may also automatically change based on the particular image 402 currently being displayed by the calculator 416. Such options may also be selectable by the user of the calculator within a settings function of the calculator 416.

In the present example shown in FIG. 4, the image 402 is displayed as a background to the user-selectable interface elements 404 and input/output display area 408 of the calculator 416. In some example embodiments, the unobstructed displayed portion of the image 402 is about $(1+\sqrt{5})/2$ times larger than the portion of the image 402 on which the operable calculator is overlaid. However, the unobstructed displayed portion of the image may be different in alternative embodiments. In some embodiments, the image 402 is displayed beside, next to or adjacent to the user-selectable interface elements 404 and input/output display area 408 of the calculator 416. In various alternative embodiments, the image 402 may be displayed in any location on the display of the mobile device 102 along with the user-selectable interface elements 404 and input/output display area 408 of the calculator 416. Also, in some embodiments, the calculator 416 and/or associated displayed image 402 may concurrently or instead be displayed and/or controlled on connected remote devices, screens and/or other displays, such as other device 110.

In the present example, the calculator 416 displays another user-selectable interface element (art gallery element 410) that when selected, provides access to a selection of selectable art objects that may be associated with the art object that is currently presented along with the calculator 416 on the graphical user interface. For example, art gallery element 410 may be a link to a gallery of digital images which are also available for purchase via the BPS 114 shown in FIG. 1. Also, art gallery element 410 may be a link to a gallery of digital images which are available for rating, comment and/or presentation along with the user-selectable interface elements 404 and input/output display area 408 of the calculator 416 on the display of the mobile device 102 instead of the current image 402 being displayed. In some embodiments, the selection of selectable art objects may be stored locally on the mobile device 102 (i.e., downloaded as part of the calculator 416 software application from backend server 112, periodically pre-cached and/or dynamically downloaded upon selection of the art gallery element 410 from backend server 112). In some embodiments, such selectable art objects may be available directly from various art object gallery service providers such as SPS 1 and/or SPS 2 shown in FIG. 1. In other various embodiments, the art gallery element 410 may be a link to a web site or other server of the backend server 112, SPS 1 and/or SPS 2 which provides the selection of selectable art objects within a web browser or within another user interface screen of the calculator 416.

Figure 5:
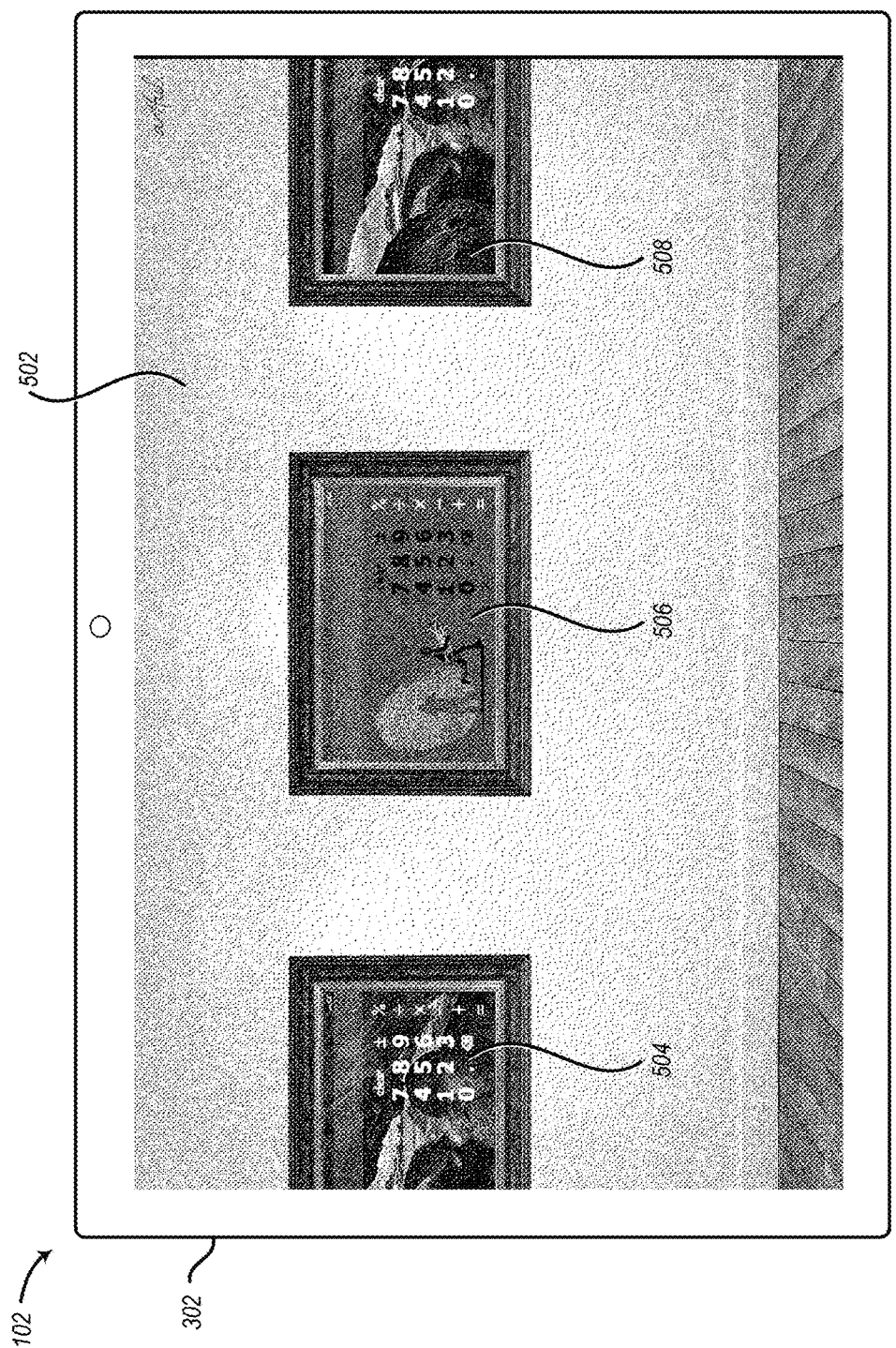
FIG. 5 is a schematic view of the mobile device of FIG. 4 displaying a selection of selectable art objects in the form of an art object gallery showing various different images that are available for presentation on the display of the mobile device as part of the calculator.

For example, FIG. 5 is a schematic view of the mobile device of FIG. 4 displaying a selection of selectable art objects in the form of an art object gallery 502 showing various different images 504, 506 and 508 that are available for presentation on the display of the mobile device 102 as part of the calculator 416 along with the user-selectable interface elements 404 and input/output display area 408 of the calculator 416. In the present example, the object gallery 502 is displayed on the mobile device 102 in response to a user selecting the art gallery element 410. Also, in the example embodiment, included on the images 504, 506 and 508 in the art object gallery 502 are images of the user-selectable interface elements 404 and input/output display area 408 of the calculator 416. This may be such that the user can preview how the particular image would look displayed along with the user-selectable interface elements 404 and input/output display area 408 of the calculator 416 in the calculator 416 if selected. In various embodiments, the user may also select the images 504, 506 and 508 for purchase, rent, comment, rating on social media or other platforms, promotion, and/or for integration with other applications. In the present embodiment, the user may use the touchscreen of the mobile device 102 to scroll with their finger through the various images 504, 506 and 508 and others not shown and then tap on their selected image.

Figure 6:
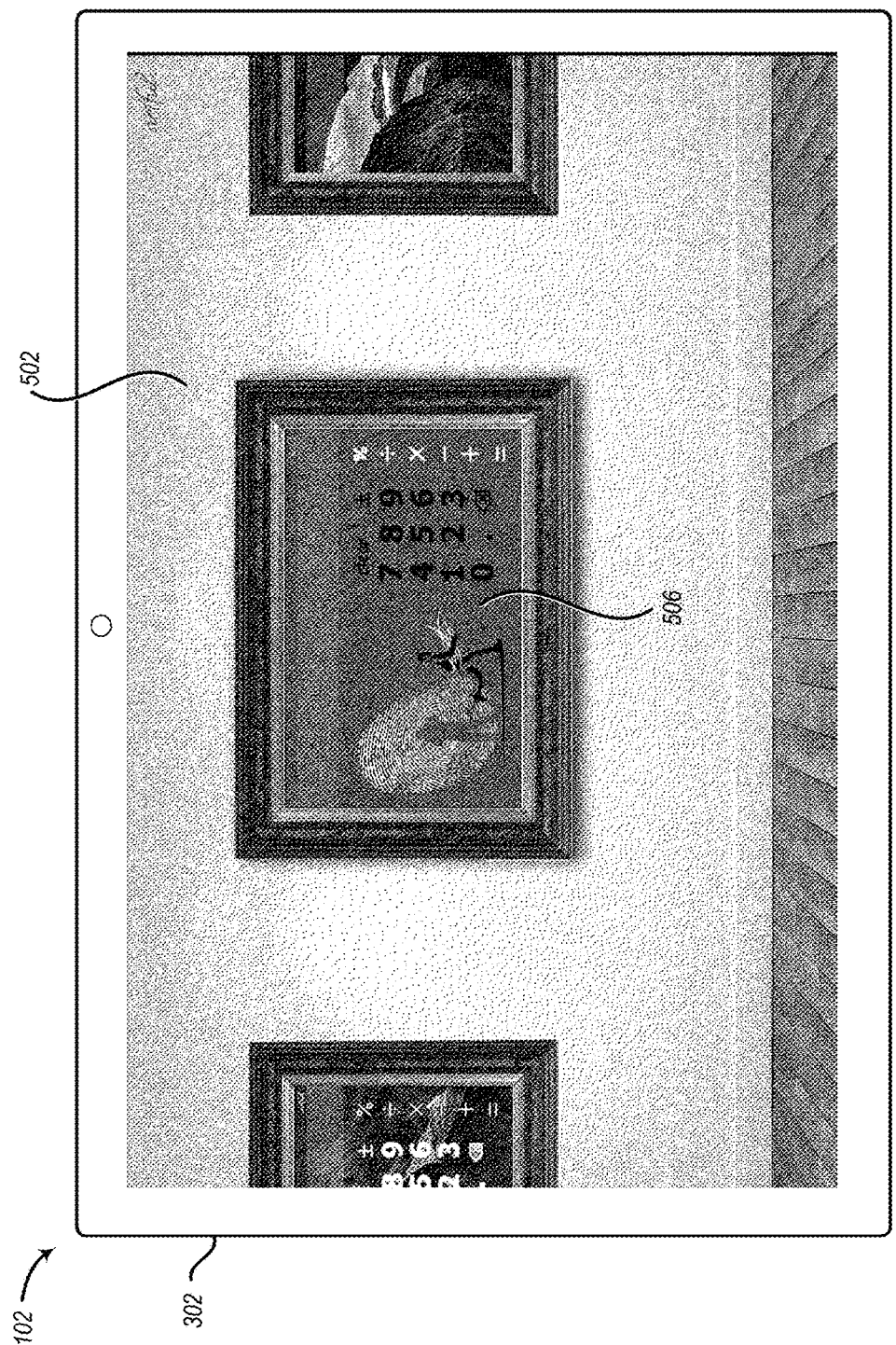
FIG. 6 is a schematic view of the mobile device of FIG. 5 displaying the art object gallery showing, in an enlarged format, the art object in the art object gallery that is in the center position on the display of the mobile device or otherwise selected by the user as an art object of interest.

For example, FIG. 6 is a schematic view of the mobile device of FIG. 5 displaying the art object gallery 502 showing, in an enlarged format, the art object 506 in the art object gallery 502 that is in the center position on the display of the mobile device 102 or otherwise selected by the user as an art object of interest. In the present example, the art object 506 is enlarged to provide a better preview of the image to the user and show the art object 506 is ready for selection. The user may then confirm selection by tapping on or otherwise confirming selection of the art object 506.

Figure 7:
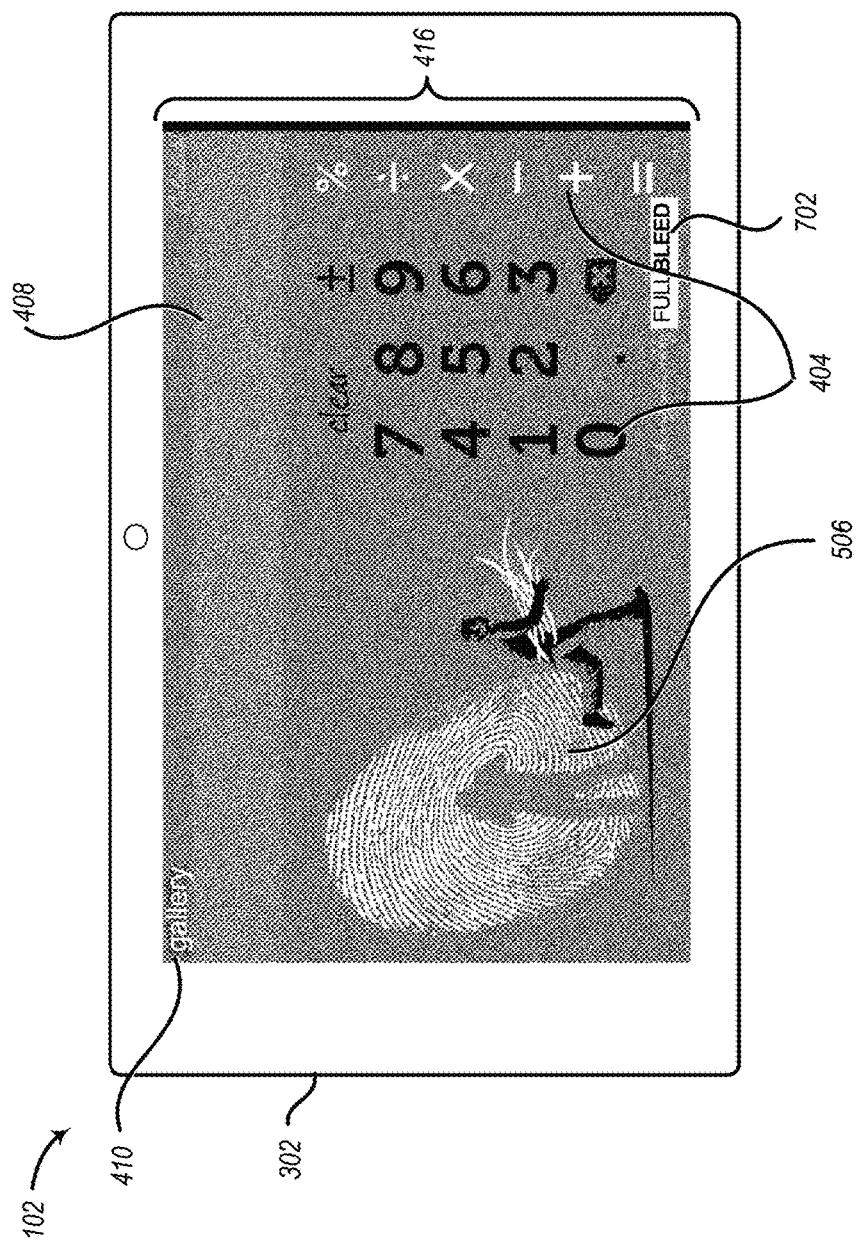
FIG. 7 is a schematic view of the mobile device of FIG. 6 displaying the calculator user interface showing the selected art object from the art object gallery shown in FIG. 6.

FIG. 7 is a schematic view of the mobile device 102 of FIG. 6 displaying the calculator user interface showing the selected art object 506 from the art object gallery 502 shown in FIG. 6. The art object 506 is shown displayed along with user-selectable interface elements representing the calculator control buttons 404 and the calculator input/output display area 408. For example, in response to the user confirming selection in the art object gallery 502 of the art object 506, the art object 506 is displayed along with user-selectable interface elements representing the calculator control buttons 404 and the calculator input/output display area 408 as shown in FIG. 7. Also shown is a user-selectable interface element 702 that, when selected by the user of the calculator, provides online access to or directs the user to additional artwork or other information regarding the artist, gallery, school, group, retail outlet or store available online that may be associated with the art object 506 currently being displayed. There may also be additional user interface elements than those shown, for example, to facilitate rating, purchase and/or rental of the art object 506 currently being displayed. Such rating may also be linked to a social media account of the user and/or artist and dynamically cause the rating or data regarding the rating to be updated in response to the applicable user interface element being selected or rating being entered via the calculator 416.

Figure 8:
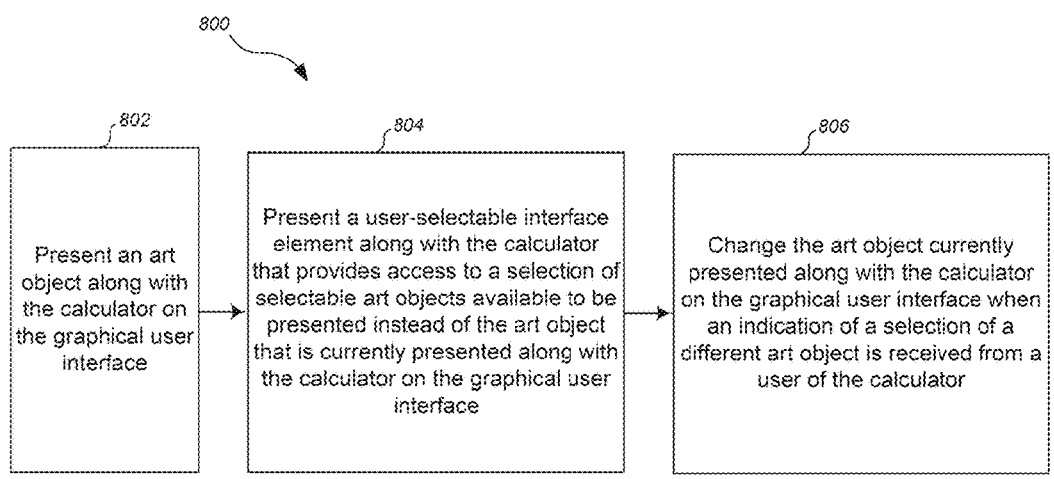
FIG. 8 is a flow diagram showing a method of providing a calculator user interface, according to one illustrated embodiment.

FIG. 8 is a flow diagram showing a method 800 of providing a calculator user interface, according to one illustrated embodiment.

At 802, a calculator presents an art object along with the calculator on the graphical user interface.

At 806, the calculator changes the art object currently presented along with the calculator on the graphical user interface when an indication of a selection of a different art object is received from a user of the calculator.

At 804, present a user-selectable interface element along with the calculator that provides access to a selection of selectable art objects available to be presented instead of the art object that is currently presented along with the calculator on the graphical user interface.

Figure 9:
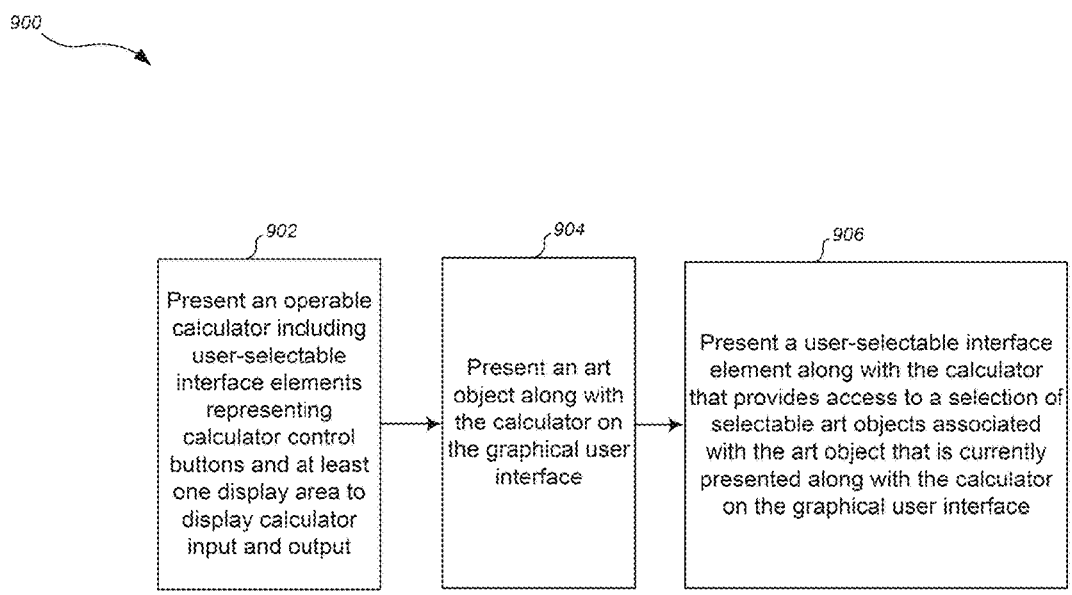
FIG. 9 is a flow diagram showing a method of providing a calculator user interface, according to another illustrated embodiment.

FIG. 9 is a flow diagram showing a method 900 of providing a calculator user interface, according to another illustrated embodiment.

At 902, a computer system presents an operable calculator including user-selectable interface elements representing calculator control buttons and at least one display area to display calculator input and output.

At 904, the computer system presents an art object along with the calculator on the graphical user interface.

At 906, the computer system presents a user-selectable interface element along with the calculator that provides access to a selection of selectable art objects that may be associated with the art object that is currently presented along with the calculator on the graphical user interface.

Figure 10:
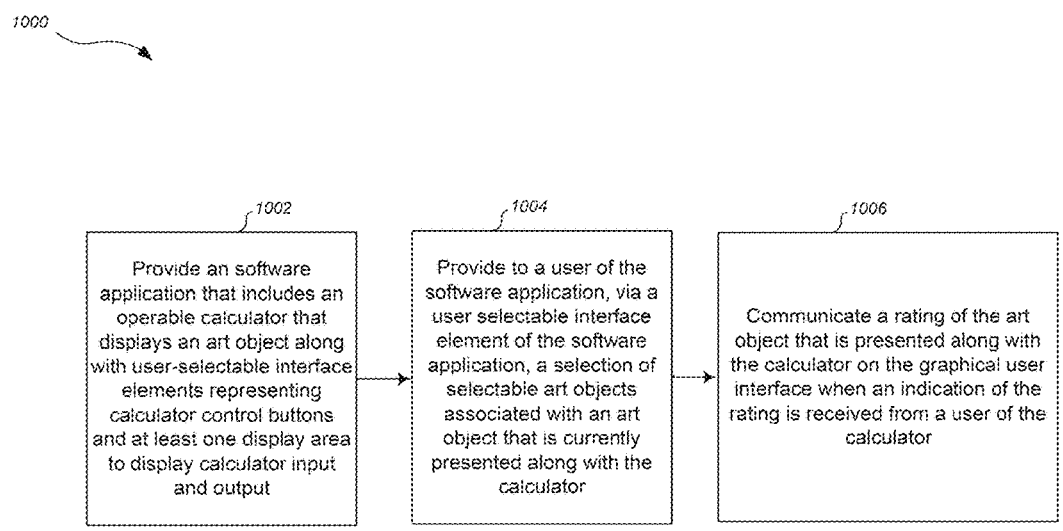
FIG. 10 is a flow diagram showing a method for communicating a rating regarding art objects, according to one example illustrated embodiment.

FIG. 10 is a flow diagram showing a method 1000 for communicating a rating regarding art objects, according to one example illustrated embodiment.

At 1002, a computer system provides software application that includes an operable calculator that displays an art object along with user-selectable interface elements representing calculator control buttons and at least one display area to display calculator input and output.

At 1004, the computer system provides to a user of the software application, via a user selectable interface element of the software application, a selection of selectable art objects that may be associated with an art object that is currently presented along with the calculator.

At 1006, the computer system communicates a rating of the art object that is presented along with the calculator on the graphical user interface when an indication of the rating is received from a user of the calculator.

The above description of illustrated embodiments, including what is described in the Abstract, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art. The teachings provided herein of the various embodiments can be applied to other systems, not necessarily the exemplary software calculator systems generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of non-transitory signal bearing media include, but are not limited to, the following: recordable type media such as solid state drives, hard disk drives, DVD ROMs, computer memory; and other non-transitory computer-readable storage media.

The various embodiments described above can be combined to provide further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer-implemented method comprising:
configuring, by at least one computer processor, a graphical user interface to present an operable calculator on a mobile device including user-selectable interface elements representing calculator control buttons and at least one display area to display calculator input and output;
configuring, by at least one computer processor, the user interface to present an art object along with the calculator on the graphical user interface;
configuring, by at least one computer processor, the graphical user interface to present a user-selectable interface element along with the calculator that, when selected, provides access to a selection of selectable art objects available for display along with the calculator on the graphical user interface;

configuring, by at least one computer processor, the graphical user interface to present, in response to receiving an indication of selection of the user-selectable interface element presented along with the calculator, the selection of selectable art objects associated with the art object;

configuring, by at least one computer processor, the graphical user interface to present a plurality of user-selectable interface elements that comprise the selection of selectable art objects associated with the art object, each user-selectable interface element of the plurality of user-selectable interface elements associated with a respective art object of the selectable art objects that, when selected, cause the art object presented along with the calculator to automatically change to the respective art object of the selectable art objects in response to the user-selectable interface element of the plurality of user-selectable interface elements being selected;

configuring, by at least one computer processor, the graphical user interface to automatically change the art object presented along with the calculator on the graphical user interface to a different art object from the selection of selectable art objects in response to the user-selectable interface element of the plurality of user-selectable interface elements being selected indicating selection of the different art object from the selection of selectable art objects from a user of the calculator, wherein one or more of the plurality of user-selectable interface elements that comprise the selection of selectable art objects associated with the art object is a digital representation of a painting;

downloading, by at least one computer processor, the selection of selectable art objects to a mobile device;

after downloading the selection of selectable art objects to a mobile device, providing, by at least one computer processor, a scrollable list of the plurality of user-selectable interface elements that comprise the selection of selectable art objects, wherein on each of various different images that comprise downloaded selectable art objects in the art object gallery, are images of user-selectable interface elements representing the calculator control buttons;

receiving, by at least one computer processor, scrolling input from the user of the calculator causing a position on a screen of the mobile device of the of user-selectable interface elements that comprise the selection of selectable art objects to change;

enlarging, by at least one computer processor, a current one of the selectable art objects on which are images of user-selectable interface elements representing the calculator control buttons based on a current position of the current one of the selectable art object on the screen of the mobile device; and providing, by at least one computer processor, on the enlarged current one of the selectable art objects on which are images of user-selectable interface elements representing the calculator control buttons, a user-selectable interface element that, when selected by the user of the calculator, provides online access to or directs the user of the calculator to additional artwork of the artist of the painting or other information regarding the artist of the painting.

2. The method of claim 1, further comprising:
making available for rating, by at least one computer processor, the one or more of the plurality of user-selectable interface elements that comprise the selection of selectable art objects associated with the art object or comment via the operable calculator of the graphical user interface.

3. The method of claim 1, wherein calculator control buttons of the current one of the selectable art objects are a different color than calculator control buttons of a different one of the selectable art objects.

4. A system for displaying art objects comprising:
a processor;
a processor-readable memory that stores instructions executable by the processor to cause the processor to:
present an operable calculator on a mobile device including user-selectable interface elements representing calculator control buttons and at least one display area to display calculator input and output;
present an art object along with the calculator on the graphical user interface;
present a user-selectable interface element along with the calculator that, when selected, provides access to a selection of selectable art objects available for display along with the calculator on the graphical user interface;
present, in response to receiving an indication of selection of the user-selectable interface element presented along with the calculator, the selection of selectable art objects associated with the art object;
present a plurality of user-selectable interface elements that comprise the selection of selectable art objects associated with the art object, each user-selectable interface element of the plurality of user-selectable interface elements associated with a respective art object of the selectable art objects that, when selected, cause the art object presented along with the calculator to automatically change to the respective art object of the selectable art objects in response to the user-selectable interface element of the plurality of user-selectable interface elements being selected;
automatically change the art object presented along with the calculator on the graphical user interface to a different art object from the selection of selectable art objects in response to the user-selectable interface element of the plurality of user-selectable interface elements being selected indicating selection of the different art object from the selection of selectable art objects from a user of the calculator, wherein one or more of the plurality of user-selectable interface elements that comprise the selection of selectable art objects associated with the art object is a digital representation of a painting;
download the selection of selectable art objects to a mobile device;
after downloading the selection of selectable art objects to a mobile device, providing, by at least one computer processor, a scrollable list of the plurality of user-selectable interface elements that comprise the selection of selectable art objects, wherein on each of various different images that comprise downloaded selectable art objects in the art object gallery, are images of user-selectable interface elements representing the calculator control buttons;
receive scrolling input from the user of the calculator causing a position on a screen of the mobile device of the of user-selectable interface elements that comprise the selection of selectable art objects to change;
enlarge a current one of the selectable art objects on which are images of user-selectable interface elements representing the calculator control buttons based on a current position of the current one of the selectable art object on the screen of the mobile device; and provide on the enlarged current one of the selectable art objects on which are images of user-selectable interface elements representing the calculator control buttons, a user-selectable interface element that, when selected by the user of the calculator, provides online access to or directs the user of the calculator to additional artwork of the artist of the painting or other information regarding the artist of the painting.

5. The system of claim 4, wherein the instructions executable by the processor, further cause the processor to:

make available for rating the one or more of the plurality of user-selectable interface elements that comprise the selection of selectable art objects associated with the art object or comment via the operable calculator of the graphical user interface.

6. The system of claim 4, wherein calculator control buttons of the current one of the selectable art objects are a different color than calculator control buttons of a different one of the selectable art objects.

7. A non-transitory computer readable storage medium, having computer-executable instructions stored thereon that, when executed by at least one computer processor, cause the at least one computer processor to:

present an operable calculator on a mobile device including user-selectable interface elements representing calculator control buttons and at least one display area to display calculator input and output;

present an art object along with the calculator on the graphical user interface;

present a user-selectable interface element along with the calculator that, when selected, provides access to a selection of selectable art objects available for display along with the calculator on the graphical user interface;

present, in response to receiving an indication of selection of the user-selectable interface element presented along with the calculator, the selection of selectable art objects associated with the art object;

present a plurality of user-selectable interface elements that comprise the selection of selectable art objects associated with the art object, each user-selectable interface element of the plurality of user-selectable interface elements associated with a respective art object of the selectable art objects that, when selected, cause the art object presented along with the calculator to automatically change to the respective art object of the selectable art objects in response to the user-selectable interface element of the plurality of user-selectable interface elements being selected;

automatically change the art object presented along with the calculator on the graphical user interface to a different art object from the selection of selectable art objects in response to the user-selectable interface element of the plurality of user-selectable interface elements being selected indicating selection of the different art object from the selection of selectable art objects from a user of the calculator, wherein one or more of the plurality of user-selectable interface elements that comprise the selection of selectable art objects associated with the art object is a digital representation of a painting;

download the selection of selectable art objects to a mobile device;

after downloading the selection of selectable art objects to a mobile device, providing, by at least one computer processor, a scrollable list of the plurality of user-selectable interface elements that comprise the selection of selectable art objects, wherein on each of various different images that comprise downloaded selectable art objects in the art object gallery, are images of user-selectable interface elements representing the calculator control buttons;

receive scrolling input from the user of the calculator causing a position on a screen of the mobile device of the of user-selectable interface elements that comprise the selection of selectable art objects to change;

enlarge a current one of the selectable art objects on which are images of user-selectable interface elements representing the calculator control buttons based on a current position of the current one of the selectable art object on the screen of the mobile device; and provide on the enlarged current one of the selectable art objects on which are images of user-selectable interface elements representing the calculator control buttons, a user-selectable interface element that, when selected by the user of the calculator, provides online access to or directs the user of the calculator to additional artwork of the artist of the painting or other information regarding the artist of the painting.

8. The computer readable storage medium of claim 7, wherein the computer-executable instructions, when executed, further cause the at least one processor to:

make available for rating the one or more of the plurality of user-selectable interface elements that comprise the selection of selectable art objects associated with the art object or comment via the operable calculator of the graphical user interface.

9. The system of claim 7, wherein calculator control buttons of the current one of the selectable art objects are a different color than calculator control buttons of a different one of the selectable art objects.

* * * * *